(12) United States Patent
Chen

(10) Patent No.: US 9,946,476 B2
(45) Date of Patent: Apr. 17, 2018

(54) MEMORY MANAGEMENT METHOD, MEMORY CONTROL CIRCUIT UNIT AND MEMORY STORAGE APPARATUS

(71) Applicant: PHISON ELECTRONICS CORP., Miaoli (TW)

(72) Inventor: Jiann-Mou Chen, Miaoli County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 50 days.

(21) Appl. No.: 14/645,368

(22) Filed: Mar. 11, 2015

(65) Prior Publication Data
US 2016/0216906 A1 Jul. 28, 2016

(30) Foreign Application Priority Data
Jan. 27, 2015 (TW) .............................. 104102669 A

(51) Int. Cl.
*G06F 12/00* (2006.01)
*G06F 3/06* (2006.01)
*G06F 12/02* (2006.01)

(52) U.S. Cl.
CPC ............ *G06F 3/0619* (2013.01); *G06F 3/061* (2013.01); *G06F 3/0659* (2013.01); *G06F 3/0688* (2013.01); *G06F 12/0246* (2013.01); *G06F 2212/7201* (2013.01); *G06F 2212/7211* (2013.01)

(58) Field of Classification Search
CPC .... G06F 3/0688; G06F 3/0659; G06F 3/0619; G06F 3/061; G06F 2212/7211; G06F 2212/7201; G06F 12/0246
See application file for complete search history.

(56) References Cited

U.S. PATENT DOCUMENTS 5,603,001 A * 2/1997 Sukegawa ............. G06F 3/0601
711/103
5,737,742 A * 4/1998 Achiwa ................. G06F 12/023
365/189.09

(Continued)

FOREIGN PATENT DOCUMENTS

TW 201346561 11/2013
TW 201351140 12/2013

OTHER PUBLICATIONS

"Office Action of Taiwan Counterpart Application", dated Oct. 8, 2015, p. 1-p. 7.

*Primary Examiner* — Larry T MacKall
(74) *Attorney, Agent, or Firm* — JCIPRNET

(57) ABSTRACT

A memory management method for a rewritable non-volatile memory module is provided. The rewritable non-volatile memory module has a plurality of devices. The method includes dividing a plurality of memory logical units to a first logical unit group mapping to physical erasing unit of a first device and a second logical unit group mapping to physical erasing units of a second device; receiving first data stored into at least one first logical unit of the first logical unit group, and writing the first data into at least one first erasing unit, mapping to the at least one first logical unit, of the first device; and recording a wear value of every device. The method also includes performing a remapping operation corresponding to a predetermined condition if an operation status of the devices meets the predetermined condition.

17 Claims, 11 Drawing Sheets

(56) References Cited

U.S. PATENT DOCUMENTS

| | | | | |
|---|---|---|---|---|
| 2011/0276746 A1* | 11/2011 | Pruthi | ................ | G06F 12/0866 |
| | | | | 711/103 |
| 2013/0290609 A1* | 10/2013 | Lee | ................ | G06F 12/0246 |
| | | | | 711/103 |

* cited by examiner

MEMORY MANAGEMENT METHOD, MEMORY CONTROL CIRCUIT UNIT AND MEMORY STORAGE APPARATUS

CROSS-REFERENCE TO RELATED APPLICATION

This application claims the priority benefit of Taiwan application serial no. 104102669, filed on Jan. 27, 2015. The entirety of the above-mentioned patent application is hereby incorporated by reference herein and made a part of this specification.

BACKGROUND

1. Technical Field

The present invention relates to a memory management method, and particularly relates to a memory management method for managing a rewritable non-volatile memory module having a plurality of devices and a memory control circuit unit and a memory storage apparatus using the same.

2. Description of Related Art

The growth of digital cameras, mobile phones, and MP3 players has been rapid in recent years. Consequently, the consumers' demand for storage media has increased tremendously. Since rewritable non-volatile memory has the advantages of being non-volatile, saving power, having a smaller volume, no mechanical structure, and quick reading/writing speed, the rewritable non-volatile memory is most suitable for portable electronic products, such as notebook computers. A solid state disk is a memory storage apparatus using flash memory as a storage medium. For these reasons, flash memory has become a thriving part of the electronic industries.

Generally speaking, when a file is being written to a rewritable non-volatile memory module, file system data (e.g., file allocation table, FAT) and user data (e.g., text data, image data, etc., of the user) are written to a solid state disk. Since reading and writing frequencies of the file system data are relatively higher than reading and writing frequencies of the user data, frequently updating the file system data may result in rapid increase in wear value of the physical erasing units corresponding to the file system data and the device that the physical erasing units belong to. Thus, the wear value of the physical erasing units storing the file system data and the device that the physical erasing units storing the file system data belong to may be higher than the wear value of the physical erasing unit not storing the file system data and the device that the physical erasing units not storing the file system data belong to, making the wear values of devices in the rewritable non-volatile memory module highly different. Accordingly, how to level the wear values of the rewritable non-volatile memory module to prevent the whole rewritable non-volatile memory module from being damaged due to a specific overly worn device is certainly an issue that the researchers in this field should work on.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention provides a memory management method, a memory control circuit unit, and a memory storage apparatus capable of elongating a lifetime of a memory storage apparatus by leveling wear values of devices of the rewritable non-volatile memory module.

An exemplary embodiment of the present invention provides a memory management method for a rewritable non-volatile memory module. The rewritable non-volatile memory module has a plurality of devices, and each of the devices has a plurality of physical erasing units. The memory management method includes: configuring a plurality of logical units, wherein the logical units are at least divided into a first logical unit group and a second logical unit group. The memory management method also includes mapping logical units in the first logical unit group to physical erasing units of a first device among the devices and mapping logical units in the second logical unit group to physical erasing units of a second device among the devices; and receiving first data stored in at least one first logical unit of the first logical unit group from a host system, writing the first data to at least one first physical erasing unit of the first device mapped to the at least one first logical unit. The memory management method further includes performing a remapping operation corresponding to a predetermined condition if an operation status of the devices meets the predetermined condition.

An exemplary embodiment of the present invention provides a memory control circuit unit for a rewritable non-volatile memory module. The rewritable non-volatile memory module has a plurality of devices, and each of the devices has a plurality of physical erasing units. The memory control circuit unit includes a host interface, a memory interface and a memory management circuit. The host interface is coupled to a host system. The memory interface is coupled to the rewritable non-volatile memory module. The memory management circuit is coupled to the host interface and the memory interface. The memory management circuit configures a plurality of logical units including a first logical unit group and a second logical unit group, The memory management circuit further maps logical units of the first logical unit group to physical erasing units of a first device of the devices and map logical units of the second logical unit group to physical erasing units of a second device of the devices. In addition, the memory management circuit further receives first data stored in at least one first logical unit of the first logical unit group from the host system and writes the first data to at least one first physical erasing unit of the first device mapped to the at least one first logical unit. Moreover, if an operation status of the devices meets a predetermined condition, the memory management circuit further performs a remapping operation corresponding to the predetermined condition.

An exemplary embodiment of the present invention provides a memory storage apparatus, including a connecting interface unit, a rewritable non-volatile memory module, and a memory control circuit unit. The connecting interface unit is coupled to a host system. The rewritable non-volatile memory module has a plurality of devices. Each of the devices has a plurality of physical erasing units. The memory control circuit unit is coupled to the connecting interface unit and the rewritable non-volatile memory module. The memory control circuit unit configures a plurality of logical units including a first logical unit group and a second logical unit group, The memory control circuit unit further maps logical units of the first logical unit group to physical erasing units of a first device of the devices and map logical units of the second logical unit group to physical erasing units of a second device of the devices. In addition, the memory control circuit unit further receives first data stored"

in at least one first logical unit of the first logical unit group from the host system and writes the first data to at least one first physical erasing unit of the first device mapped to the at least one first logical unit. Moreover, if an operation status of the devices meets a predetermined condition, the memory control circuit unit further performs a remapping operation corresponding to the predetermined condition.

Based on the above, according to the memory management method, the memory control circuit unit, and the memory storage apparatus according to the exemplary embodiments of the present invention, the wear value of each device of the rewritable non-volatile memory is recorded. In addition, when the wear value of a device is highly different from the wear value of another device, the logical units corresponding to frequently updated or accessed data are remapped from the physical erasing units of the device having a higher wear value to the physical erasing units of the device having a lower wear value. In addition, according to the memory management method, the memory control circuit unit, and the memory storage apparatus according to the exemplary embodiments of the present invention, the memory control circuit unit and the memory storage apparatus further switch the logical units originally mapped to the physical erasing units of the devices after performing the erasing operation to all the data of the devices or performing the format operation to the devices. In this way, the memory management method, the memory control circuit unit, and the memory storage apparatus according to the exemplary embodiments of the present invention are able to keep the wear values of the devices in the rewritable non-volatile memory leveled, thereby elongating the lifetime of the memory storage apparatus.

It should be understood; however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

To make the above features and advantages of the invention more comprehensible, embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
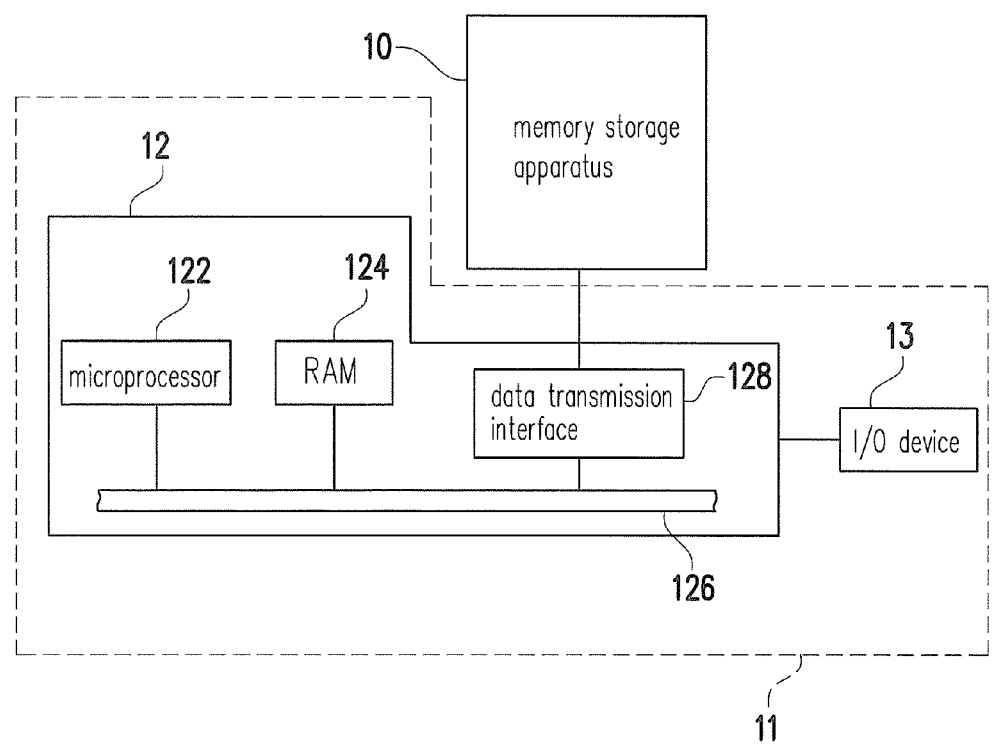
FIG. 1 is an exemplary schematic view illustrating a host system and a memory storage apparatus according to a first exemplary embodiment.

Reference will now be made in detail to the present embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally speaking, a memory storage apparatus (i.e., a memory storage system) includes a rewritable non-volatile memory module and a controller (i.e., a control circuit unit). The memory storage apparatus is usually used together with a host system, such that the host system is able to write data into or read data from the memory storage apparatus.

First Exemplary Embodiment

Figure 2:
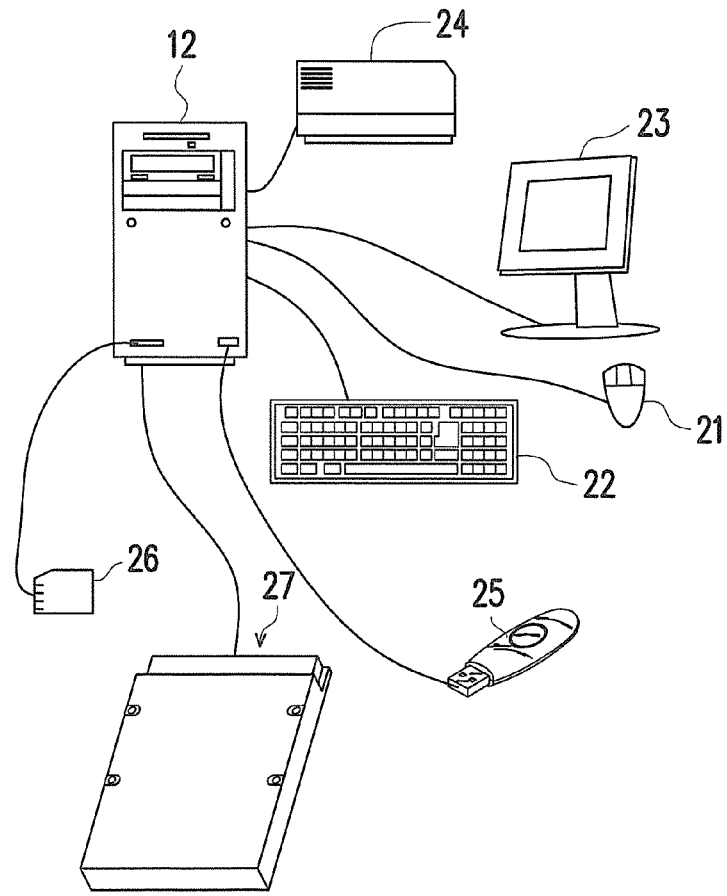
FIG. 2 is an exemplary schematic view illustrating a computer, an input/output device, and a memory storage apparatus according to an exemplary embodiment.

FIG. 1 is an exemplary schematic view illustrating a host system and a memory storage apparatus according to a first exemplary embodiment, and FIG. 2 is an exemplary schematic view illustrating a computer, an input/output device, and a memory storage apparatus according to an exemplary embodiment of the invention.

Referring to FIG. 1, a host system 11 generally includes a computer 12 and an input/output (I/O) device 13. The computer 12 includes a microprocessor 122, a random access memory (RAM) 124, a system bus 126, and a data transmission interface 128. The input/output device 13 includes a mouse 21, a keyboard 22, a display 23, and a printer 24 shown in FIG. 2, for example. It should be understood that the devices shown in FIG. 2 do not serve to limit the input/output device 13. The input/output device 13 may include other devices.

In an exemplary embodiment, the memory storage device 10 is coupled to other components in the host system 11 through the data transmission interface 128. By using the microprocessor 122, the random access memory 124, and the input/output device 13, the data are written to or read from the memory storage apparatus 10. For example, the memory storage apparatus 10 may be a rewritable non-volatile memory storage apparatus such as a flash drive 25, a memory card 26, or a solid state derive (SSD) 27, etc., as shown in FIG. 2.

Figure 3:
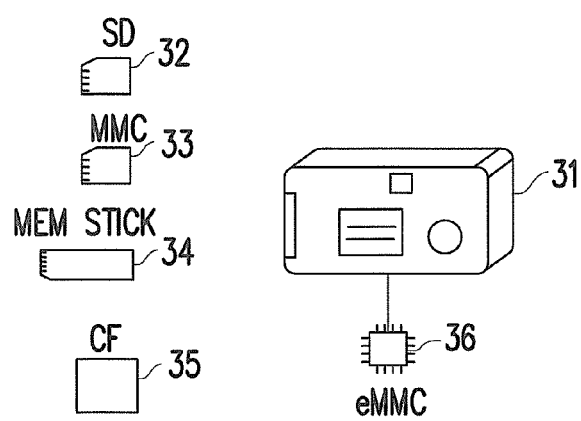
FIG. 3 is an exemplary schematic view illustrating a host system and a memory storage apparatus according to an exemplary embodiment.

FIG. 3 is an exemplary schematic view illustrating a host system and a memory storage apparatus according to an exemplary embodiment.

Generally speaking, the host system 11 may substantially be any system collocated with the memory storage apparatus 10 for storing data. Even though the host system 11 is described as a computer system in this exemplary embodiment, in another exemplary embodiment, the host system 11 may be a system such as a digital camera, a video camera, a communication device, an audio player, or a video player, etc. For example, when the host system 1000 is a digital camera (or video camera) 31, the rewritable non-volatile memory storage apparatus is a SD card 32, a MMC card 33, a memory stick 34, a CF card 35, or an embedded storage device 36 (as shown in FIG. 3). The embedded storage device 36 includes an embedded MMC (eMMC). It should be mentioned that the eMMC is directly coupled to a substrate of the host system.

Figure 4:
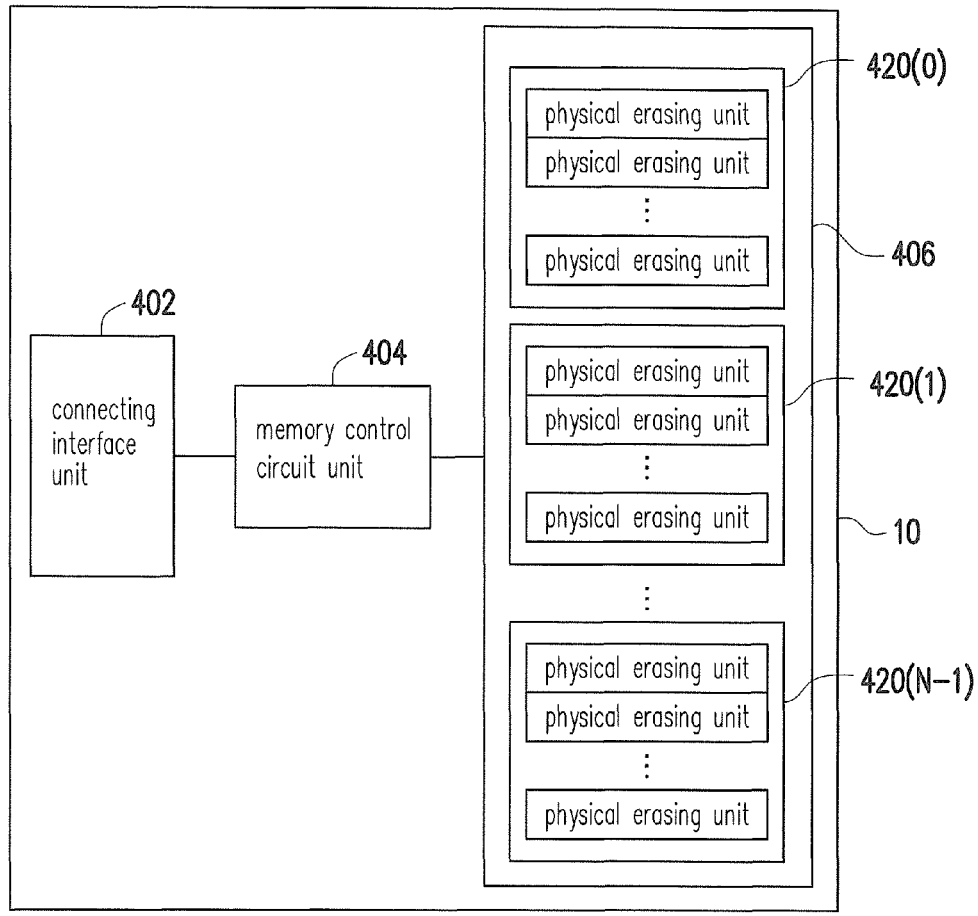
FIG. 4 is a schematic block view illustrating a memory storage apparatus according to the first exemplary embodiment.

FIG. 4 is a schematic block view illustrating a memory storage apparatus according to the first exemplary embodiment.

Referring to FIG. 4, the memory storage apparatus 10 includes a connecting interface unit 402, a memory control circuit unit 404, and a rewritable non-volatile memory module 406.

In this exemplary embodiment, the connecting interface unit 402 is compatible with the serial advanced technology attachment (SATA) standard. However, it should be understood that the invention is not limited thereto. The connecting interface unit 402 may be compatible with the parallel advanced technology attachment (PATA) standard, the Institute of Electrical and Electronic Engineers (IEEE) 1394 standard, the peripheral component interconnect express (PCI Express) standard, the universal serial bus (USB) standard, the secure digital (SD) interface standard, the ultra high speed-I (UHS-I) interface standard, the ultra high speed-II (USH-II) interface standard, the memory stick (MS) interface standard, multimedia card (MMC) interface standard, the embedded multimedia card (eMMC) interface standard, the universal flash storage (UFS) interface standard, the compact flash (CF) interface standard, the integrated device electronics (IDE) standard, or other suitable standards.

The memory control circuit unit 404 is configured to perform a plurality of logic gates or control instructions implemented in a form of hardware or firmware and perform operations, such as data writing, reading, and erasing operations, etc., in the rewritable non-volatile memory module 406 according to a command of the host system 11. The connecting interface unit 402 may be packaged in the same chip with the memory control circuit unit 404, or the connecting interface unit 402 may be configured outside a chip including the memory control circuit unit 404.

The rewritable non-volatile memory module 406 is coupled to the memory control circuit unit 404, and stores data written by the host system 11. The rewritable non-volatile memory module 406 may be a single level cell (SLC) NAND flash memory module, a multi-level cell (MLC) NAND flash memory module (i.e., a flash memory module where one memory cell stores two bits of data) and a triple level cell (TLC) NAND flash memory (i.e., a flash memory module where one memory cell stores three bits of data), other flash memory modules or other memory modules having the same characteristics. Specifically, in this exemplary embodiment, the rewritable non-volatile memory module 406 has a plurality of devices. For example, as shown in FIG. 4, the rewritable non-volatile memory module 406 includes devices 420(0) to 420(N−1). In addition, the number of the devices is two or more. Each of the devices has a plurality of physical erasing units. For example, the first device 420(0) has a plurality of physical erasing units 410(0) to 410(N), and the second device 420(1) has a plurality of physical erasing units 411(0) to 411(N), and so on so forth. It should be noted that the number of the physical erasing units in each of the devices is not limited in the present invention.

Also, in this exemplary embodiment, the devices of the rewritable non-volatile memory module 406 are determined based on memory planes of memory dies of the rewritable non-volatile memory module 406. Specifically, the rewritable non-volatile memory module 406 may have one or more memory dies, each memory die may have one or more memory planes, and each memory plane has a plurality of physical erasing units. When the memory module is manufactured, the manufacturer may group one or more memory planes into a device based on the requirement. Thus, the manufacturer may manage the rewritable non-volatile memory module 406 by using the device as a unit. The invention does not intend to limit the number of memory planes included in each device.

Figure 5:
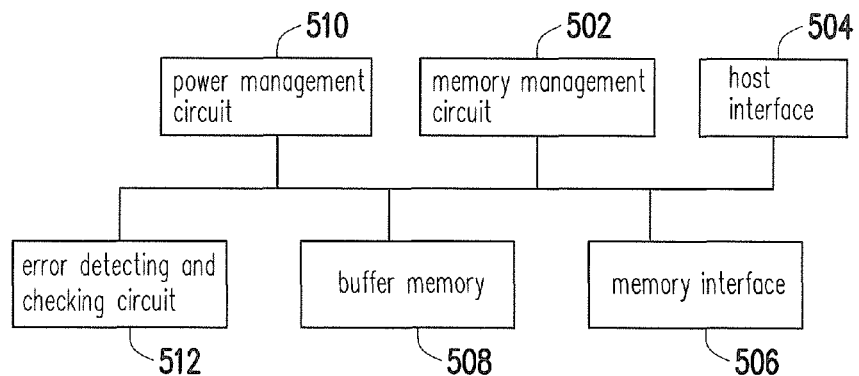
FIG. 5 is a schematic block view illustrating a rewritable non-volatile memory module according to the first exemplary embodiment.

FIG. 5 is a schematic block view illustrating a memory control circuit unit according to the first exemplary embodiment.

Referring to FIG. 5, the memory control circuit unit 404 includes a memory management circuit 502, a host interface 504, a memory interface 506, a buffer memory 508, a power management circuit 510, and an error detecting and correcting (ECC) circuit 512.

The memory management circuit 502 is configured to control the overall operation of the memory control circuit unit 404. Specifically, the memory management circuit 502 has a plurality of control instructions. When the memory storage apparatus 100 is being operated, the control instructions are executed to perform operations such as data writing, reading and erasing operations, etc. In the following, description about an operation of the memory management circuit 502 is equivalent to description about an operation of the memory control circuit unit 404, and repeated contents are thus not reiterated.

In this embodiment, the control instructions of the memory management circuit 502 are implemented in the form of firmware. For example, the memory management circuit 502 has a microprocessor unit (not shown) and a read-only memory (not shown). Also, the control instructions are burnt into the read-only memory. When the memory storage apparatus 100 is operated, the control instructions are executed by the microprocessor to perform the operations such as data writing, reading and erasing operations, etc.

In another exemplary embodiment of the invention, the control instructions of the memory management circuit 502 may also be stored in a form of programming codes in a specific area of the rewritable non-volatile memory module 406 (e.g., the system area specifically designated for storing the system data in the memory module, for example). Besides, the memory management circuit 502 has the microprocessor (not shown), a read-only memory (not shown), and a random access memory (not shown). In particular, the read-only memory stores boot codes, and when the memory control circuit unit 404 is enabled, the microprocessor unit firstly executes the boot codes to load the control instructions stored in the rewritable non-volatile memory module 406 to the random access memory of the memory management circuit 502. Afterwards, the microprocessor unit executes the control instructions for various data operations such as data writing, reading and erasing operations, etc.

Also, in another exemplary embodiment, the control instructions of the memory management circuit 502 may also be implemented in the hardware form. For example, the memory management circuit 502 includes a microcontroller, a memory cell management circuit, a memory writing circuit, a memory reading circuit, a memory erasing circuit, and a data processing circuit. The memory cell management circuit, the memory writing circuit, the memory reading circuit, the memory erasing circuit, and the data processing circuit are electrically connected to the microcontroller. In addition, the memory cell management circuit is configured to manage physical erasing units of the rewritable non-volatile memory module 406. The memory writing circuit is configured to send the writing command to the rewritable non-volatile memory module 406 to write data to the rewritable non-volatile memory module 406. The memory reading circuit is configured to send the reading command to the rewritable non-volatile memory module 406 to read data from the rewritable non-volatile memory module 406. The memory erasing circuit is configured to send the erasing command to the rewritable non-volatile memory module 406 to erase data from the rewritable non-volatile memory module 406. The data processing circuit is configured to process data to be written to the rewritable non-volatile memory module 406 and data to be read from the rewritable non-volatile memory module 406.

The host interface 504 is electrically connected to the memory management circuit 502 and configured to receive and identify the commands and data transmitted by the host system 1000. In other words, the commands and data from the host system 1000 are transmitted to the memory management circuit 502 through the host interface 504. In this exemplary embodiment, the host interface 504 is compatible with the SATA standard. However, it should be understood that the present invention is not limited thereto, and the host interface 504 may also be compatible with the PATA standard, the IEEE01394 standard, the PCI Express standard, the USB standard, the UHS-I interface standard, the UHS-II interface standard, the MS standard, the MMC standard, the CF standard, the IDE standard, or other suitable data transmission standard.

The memory interface 506 is electrically connected to the memory management circuit 502 and accesses the rewritable non-volatile memory module 406. In other words, data to be written into the rewritable non-volatile memory module 406 are converted into a format acceptable for the rewritable non-volatile memory module 406 by the memory interface 506. Specifically, when the memory management circuit 502 intends to access the rewritable non-volatile memory module 406, the memory interface 506 may transmit a corresponding sequence of commands. The sequence of commands may include one or more signals or data on a bus. For example, a reading sequence of commands may include information such as a reading identification code, a memory address, etc.

The buffer memory 508 is electrically connected to the memory management circuit 502 and configured to temporarily store the data and commands from the host system 1000 or the data from the rewritable non-volatile memory module 406. The memory control circuit unit 404 plans to temporarily store the data from the host system 1000 or the data from the rewritable non-volatile memory module 406 in the buffer memory 508, such that the data are organized to be in a predetermined unit size or a transmission unit size and written to the rewritable non-volatile memory module 406 or transmitted back to the host system. In addition, the buffer memory 508 may also temporarily store system management data used by the memory control circuit unit 404, such as a file allocation table or a logical-physical unit mapping table, etc.

The power management circuit 510 is electrically connected to the memory management circuit 502 and configured to control a power source of the memory storage apparatus 100.

The error detecting and correcting circuit 512 is electrically connected to the memory management circuit 502 and configured to perform an error detecting and correcting process to ensure the correctness of data. Specifically, when the memory management circuit 502 receives a writing command from the host system 1000, the error detecting and correcting circuit 512 may generate a corresponding error correcting code (ECC code) and/or error detecting code (EDC) for data corresponding to the writing command. In addition, the memory management circuit 502 may write the data corresponding to the writing command and the corresponding error correcting code and error detecting code to the rewritable non-volatile memory module 406. Subsequently, when the memory management circuit 502 reads the data from the rewritable non-volatile memory module 406, the error correcting code and/or error detecting code corresponding to the data is also read by the memory management circuit 502 simultaneously, and the error detecting and correcting circuit 512 executes the error detecting and correcting process for the data being read based on the error detecting code and/or error correcting code.

Figure 6:
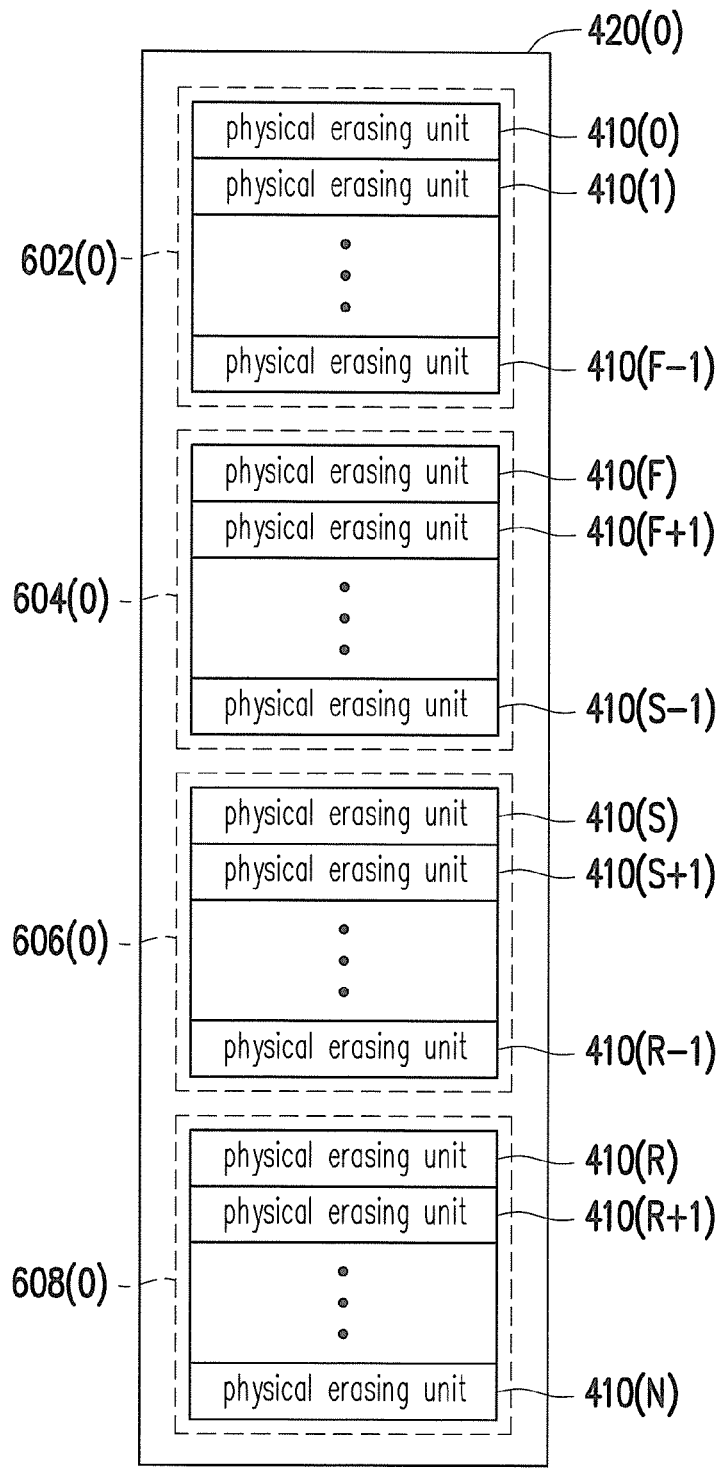
FIGS. 6 and 7 are schematic views illustrating managing a rewritable non-volatile memory module according to the first exemplary embodiment.

FIG. 6 is a schematic view illustrating a device managing a rewritable non-volatile memory module according to the first exemplary embodiment.

It should be understood that when describing the operation of the rewritable non-volatile memory module 406, terms such as "choosing," "grouping," "dividing," and "associating" refer to logical concepts. In other words, an actual position of the physical erasing unit of the rewritable non-volatile memory module is not changed. Instead, an operation is logically performed to the physical erasing unit of the rewritable non-volatile memory module. In the following, with reference to FIG. 6, a management framework of a device of the rewritable non-volatile memory module is described based on the first device 420(0). The management framework is also applicable to other devices of the rewritable non-volatile memory module. Thus, repeated contents will not be reiterated.

Referring to FIG. 6, the first device 420(0) of the rewritable non-volatile memory module 406 has the physical erasing units 410(0) to 410(N), and each physical erasing unit has a plurality of physical programming units. In this exemplary embodiment, the physical programming unit is the minimum unit for programming. That is, the physical programming unit is the minimum unit for writing data. For example, the physical programming unit is a physical page or a physical sector. If the physical programming unit is a physical page, then each physical programming unit usually includes a data bit area and a redundant bit area. The data bit area includes a plurality of physical sectors for storing user data, while the redundant bit area is configured to store system data (e.g., error correcting code). Besides, the physical erasing unit is the minimum unit for erasing. Namely, each physical erasing unit contains the least number of memory cells to be erased together. For example, the physical erasing unit is a physical block.

The memory control circuit unit 404 (or the memory management circuit 502) may logically group the physical erasing units 410(0) to 410(N) of the first device 420(0) into a data area 602(0), a spare area 604(0), a system area 606(0), and a replacement area 608(0).

The physical erasing units logically belong to the data area 602(0) and the spare area 604(0) store data of the host system 11, and the physical units in the data area 602(0) and the spare area 604(0) may be mapped to a plurality of logical units of the host system 11. Specifically, the physical erasing units of the data area 602(0) are considered as physical erasing units already storing data, and the physical erasing units in the spare area 604(0) are considered as the physical erasing units for replacing the physical erasing units in the data area 602(0). In other words, if the memory control circuit unit 404 (or the memory management circuit 502) receives a writing command and data to be written corresponding to the writing command from the host system 11 and the writing command instructs to store the data to be written to at least one first logical unit, the memory control circuit unit 404 (or the memory management circuit 502) may store the data to be written to at least one first physical erasing unit of the first device mapped to the at least one first logical unit in response to the writing command. Alternatively, if there is no physical erasing unit mapped to the at least one first logical unit in the data area 602(0), the memory control circuit unit 404 (or the memory management circuit 502) may choose at least one physical erasing unit from the spare area 604(0) as the at least one first physical erasing unit, and then write the data to the at least one first physical erasing unit, so as to replace the physical erasing unit in the data area 602(0) of the first device 420(0).

The physical erasing unit logically belonging to the system area 606(0) records system data of the first device 420(0). For example, the system data may include the manufacturer and model number of the rewritable non-volatile memory module, numbering of the memory dies of the first device 420(0), number of the physical erasing units of the first device 420(0), and the number of physical programming units of each physical erasing unit, etc.

The physical erasing unit logically belonging to the replacement area 608(0) is used in a replacement process for a damaged physical erasing unit and replaces the damaged physical erasing unit in the first device 420(0). Specifically, if there is still a normal physical erasing unit in the replacement area 608(0) and there is a damaged physical erasing unit in the data area 602(0), the memory control circuit 404 (or the memory management circuit 502) may choose the normal physical erasing unit from the replacement area 608(0) to replace the damaged physical erasing unit.

In particular, the numbers of physical erasing units in the data area 602(0), the spare area 604(0), the system area 606(0), and the replacement area 608(0) of the first device 420(0) may be different from one another according to the different memory specifications. Besides, it should be understood that in an operation of the memory storage apparatus 10, grouping relations of the physical erasing units grouped to the data area 602(0), the spare area 604(0), the system area 606(0), and the replacement area 608(0) change dynamically. For example, when the physical erasing unit in the spare area 604(0) is damaged and replaced by the physical erasing unit in the replacement area 608(0), the physical erasing unit originally associated with the replacement area 608(0) is associated with the spare area 604(0). Alternatively, after the physical erasing unit in the spare area 604(0) is chosen to store the written data, the memory control circuit unit 404 (or the memory management circuit 502) may associate this physical erasing unit with the data area 602(0) and map the logical unit corresponding to the written data to the physical erasing unit.

Figure 7:
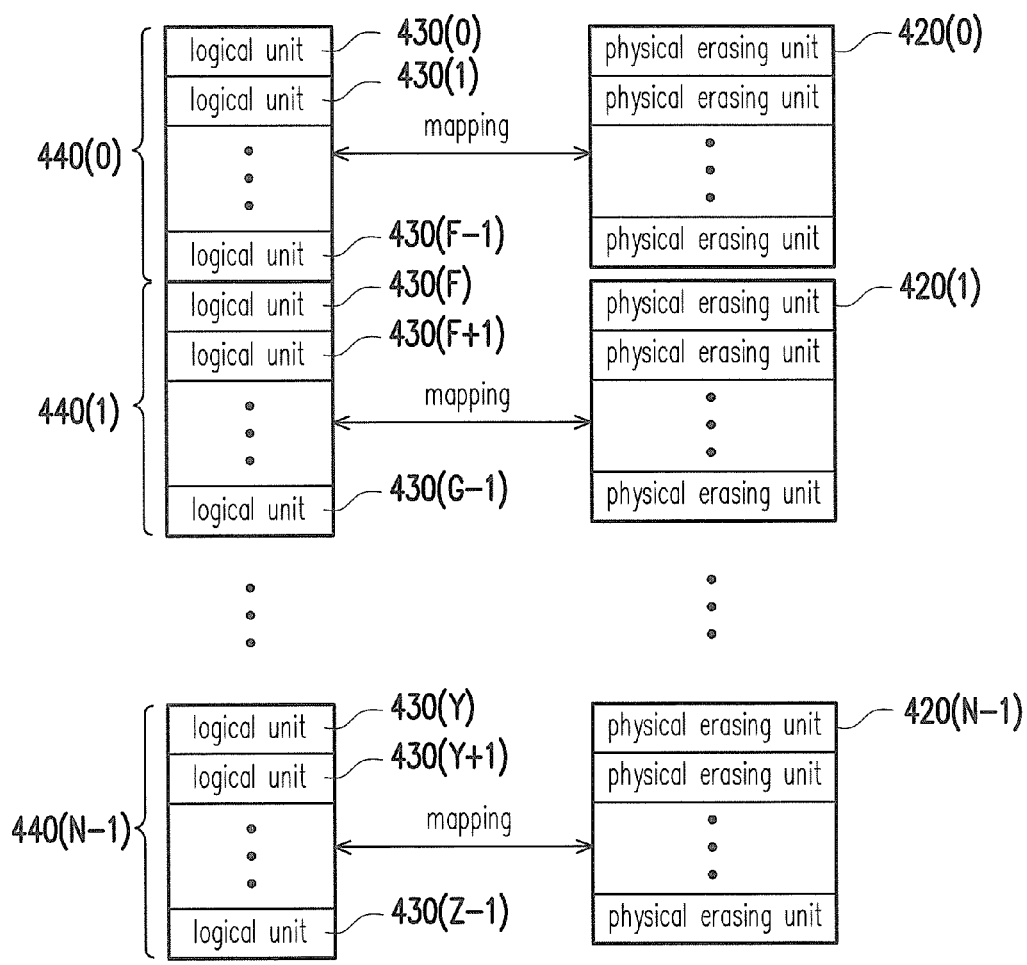

FIG. 7 is a schematic view illustrating a mapping relation between a logical unit group of a rewritable non-volatile memory module and a device according to the first exemplary embodiment of the invention.

In this exemplary embodiment, the memory control circuit unit 404 (or the memory management circuit 502) may manage a plurality of logical units accessed by the host system by using the device in the rewritable non-volatile memory module 406 as a unit. Specifically speaking, referring to FIG. 7, assuming that continuous logical units accessed by the host system are logical units 430(0) to 430(Z-1), and the memory control circuit unit 404 (or the memory management circuit 502) may group the logical units into a plurality of logical unit groups accordingly. For example, as shown in FIG. 7, the memory control circuit unit 404 (or the memory management circuit 502) may group the logical units 430(0) to 430(Z-1) into a first logical unit group 440(0), a second logical unit group 440(1), etc. In this exemplary embodiment, the number of logical units in each logical unit group is determined based on the number of devices corresponding to each logical unit group. In other words, the memory control circuit unit 404 (or the memory management circuit 502) may group the logical units 430(0) to 430(Z-1) according to the number of devices of the rewritable non-volatile memory module 406.

For example, in a case where the rewritable non-volatile memory module 406 has N devices (e.g., the devices 420(0) to 420(N-1) shown in FIG. 7), the memory control circuit unit 404 (or the memory management circuit 502) may group the logical units 430(0) to 430(Z-1) into N logical unit groups (e.g., the logical unit group 440(0) to 440(N-1) shown in FIG. 7). Herein, N is a positive integer equal to or greater than 2. The memory management circuit 502 may configure the logical units 430(0) to 430(F-1) of the first logical unit group 440(0) to map the physical erasing units of the first device 420(0). Accordingly, the logical units 430(F) to 430(G-1) of the second logical unit group 440(1) are mapped to the physical erasing units of the second device 420(1), and the logical units 430(Y) to 430(Z-1) of the N-th logical unit group 440(N-1) are mapped to the physical erasing units of the N-th device 420(N-1). It should be noted that in the example shown in FIG. 7, the logical units of each logical unit group are mapped to the physical erasing units of the same device. However, the present invention is not limited thereto. For example, in other exemplary embodiments, the logical units in each logical unit group may be mapped to the physical erasing units of different devices.

Figure 8:
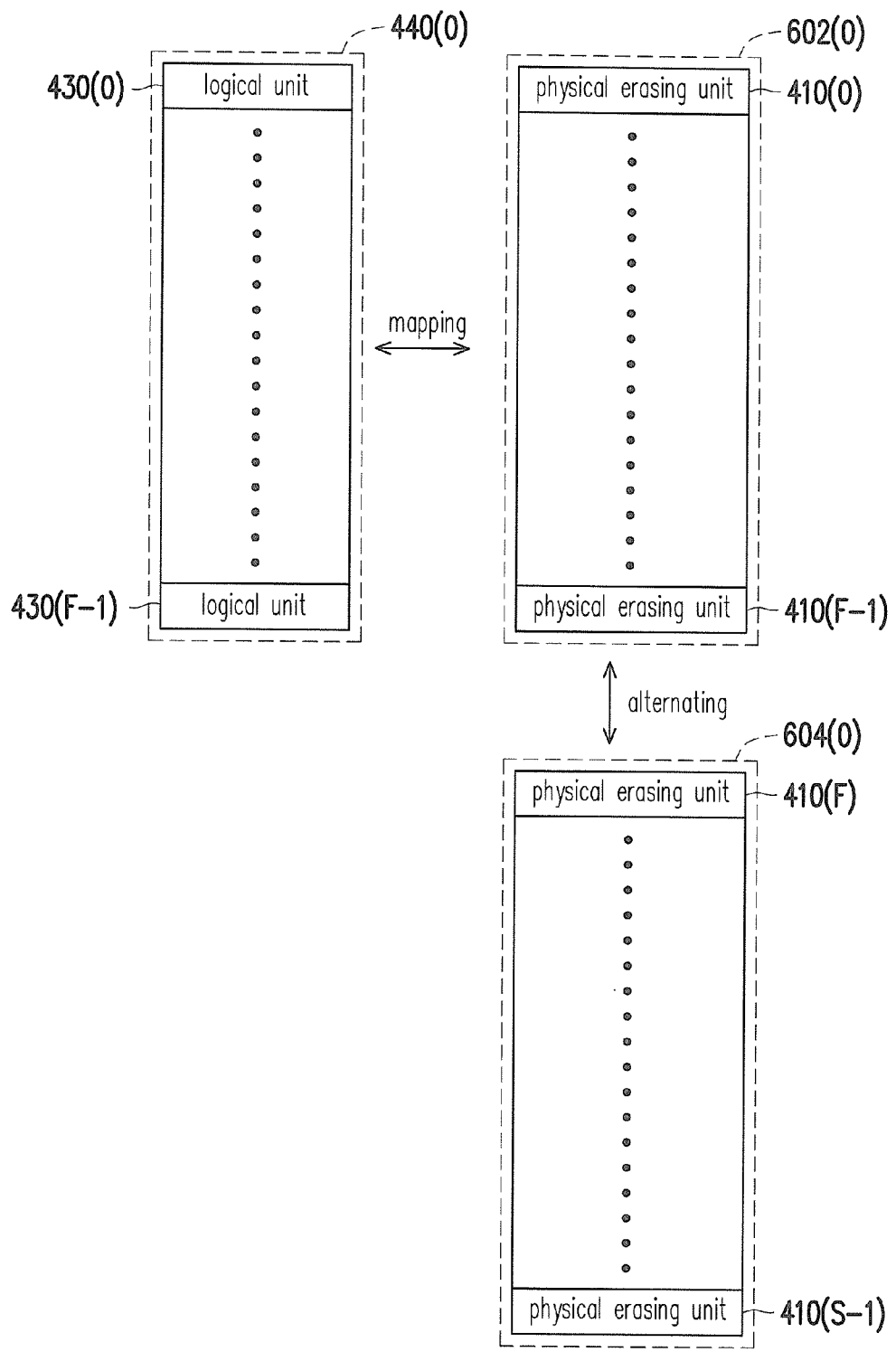
FIG. 8 is a schematic view illustrating a device managing a rewritable non-volatile memory module according to the first exemplary embodiment.

FIG. 8 is a schematic view illustrating a device managing a rewritable non-volatile memory module according to the first exemplary embodiment. In the following, a management framework of the devices of the rewritable non-volatile memory module is described with reference to a mapping relation between the first logical unit group 440(0) and the first device 420(0). The same management framework also applies to other devices of the rewritable non-volatile memory module, and is thus not reiterated below.

Referring to FIG. 8, in a case where the memory control circuit unit 404 (or the memory management circuit 502) already configures the logical units 430(0) to 430(F-1) of the first logical unit group 440(0) to map to the physical erasing units 410(0) to 410(F−1) in the data area 602(0) of the first device 420(0), the host system 11 accesses the data in the data area 602(0) through the logical units 430(0) to 430(F−1). Here, each of the logical units 430(0) to 430(F−1) may be formed of one or more logical addresses. Each logical unit may be mapped to one or more physical units. In addition, each physical unit may be one or more physical addresses, one or more physical sectors, one or more physical programming units, or one or more physical erasing units. In this exemplary embodiment, in correspondence with each device, the memory control circuit unit 404 (or the memory management circuit 502) may establish the logical-physical mapping table, so as to record a mapping relation between the logical units and the physical erasing units of each device. In other words, the memory control circuit unit 404 (or the memory management circuit 502) may use the logical-physical mapping table corresponding to each device for the corresponding device, so as to manage the mapping relation between the physical erasing units of each device and the logical units mapped to the physical erasing units. For example, the memory control circuit unit 404 (or the memory management circuit 502) may establish a first logical-physical mapping table to manage a mapping relation between the physical erasing units of the first device 420(0) and the logical units that are mapped to.

In this exemplary embodiment, when the host system 11 intends to write data to one of the logical units 430(0) to 430(F−1) or update data stored in one of the logical units 430(0) to 430(F−1), the memory control circuit unit 404 (or the memory management circuit 502) may write the data to the physical erasing unit mapped to this logical unit, or, the memory control circuit unit 404 (or the memory management circuit 502) may choose a physical erasing unit from the spare area 604(0) of the first device 420(0) and write the data to this physical erasing unit. In particular, the memory control circuit unit 404 (or the memory management circuit 502) may load the first logical-physical mapping table from the rewritable non-volatile memory module 406 to the buffer memory 508, and update a mapping relation between the logical unit and the physical erasing unit storing the data belonging to the logical unit in the first logical-physical mapping table. Then, the memory control circuit unit 404 (or the memory management circuit 502) may find the corresponding physical erasing unit based on the first logical-physical mapping table and may read the data from the physical erasing unit.

For example, in an example where first data is to be written to one logical unit (also called "first logical unit") of the logical units 430(0) to 430(F−1) of the first logical unit group 440(0), if the first logical unit is mapped to a physical erasing unit (also called "first physical erasing unit") in the data area 602(0) of the first device 420(0), the memory control circuit unit 404 (or the memory management circuit 502) may choose the first physical erasing unit to store the first data based on the first logical-physical mapping table recording the mapping relation.

Besides, in another example, if the first logical unit is not yet mapped to any physical erasing unit, the memory control circuit unit 404 (or the memory management circuit 502) may choose a first physical erasing unit (also called "first physical erasing unit") from the spare area 604(0) of the first device 420(0) to store the first data. In addition, after writing the first data to the first physical erasing unit, the memory control circuit unit 404 (or the memory management circuit 502) may associate the first physical erasing unit with the data area 602(0) of the first device 420(0), map the first logical unit to the first physical erasing unit, and correspondingly update the first logical-physical mapping table of the first device 420(0) having the first physical erasing unit.

In this exemplary embodiment, when the memory control circuit unit 404 (or the memory management circuit 502) intends to write data to a physical erasing unit, the memory control circuit unit 404 (or the memory management circuit 502) may determine whether the physical erasing unit is already or about to become full. If the physical erasing unit is already full or about to become full, the memory control circuit unit 404 (or the memory management circuit 502) may choose another physical erasing unit from the spare area 604(0) as a physical erasing unit currently in use, so as to continue writing data to the physical erasing unit currently in use. Besides, the memory control circuit unit 404 (or the memory management circuit 502) may perform a data merging process or a garbage collection process to one or more physical erasing units storing valid data in the data area 602(0), so as to release one or more physical erasing units and associating the one or more physical erasing units to the spare area 604(0). For example, the memory control circuit unit 404 (or the memory management circuit 502) may write data belonging to a logical unit to a physical erasing unit chosen from the spare area 604(0) and label a portion of data of a physical erasing unit originally mapped to the logical unit in the data area 602(0) as invalid data. Then, the memory control circuit unit 404 (or the memory management circuit 502) may copy remaining valid data in the physical erasing unit originally mapped to the logical unit to the physical erasing unit chosen from the spare area 604(0) and associate the physical erasing unit originally mapped to the logical unit with the spare area 604(0). In this way, the data merging process is completed. In the garbage collection process, valid data stored in one or more physical programming units in the data area 602(0) are copied to one or more physical erasing units chosen from the spare area 604(0). In addition, the physical erasing unit whose data stored therein are completely copied is then associated with the spare area 604(0). The physical erasing unit associated with the spare area 604(0) may be associated with the spare area 604(0) before or after erasing of data. The present invention does not intend to limit a time point of erasing.

Figure 9:
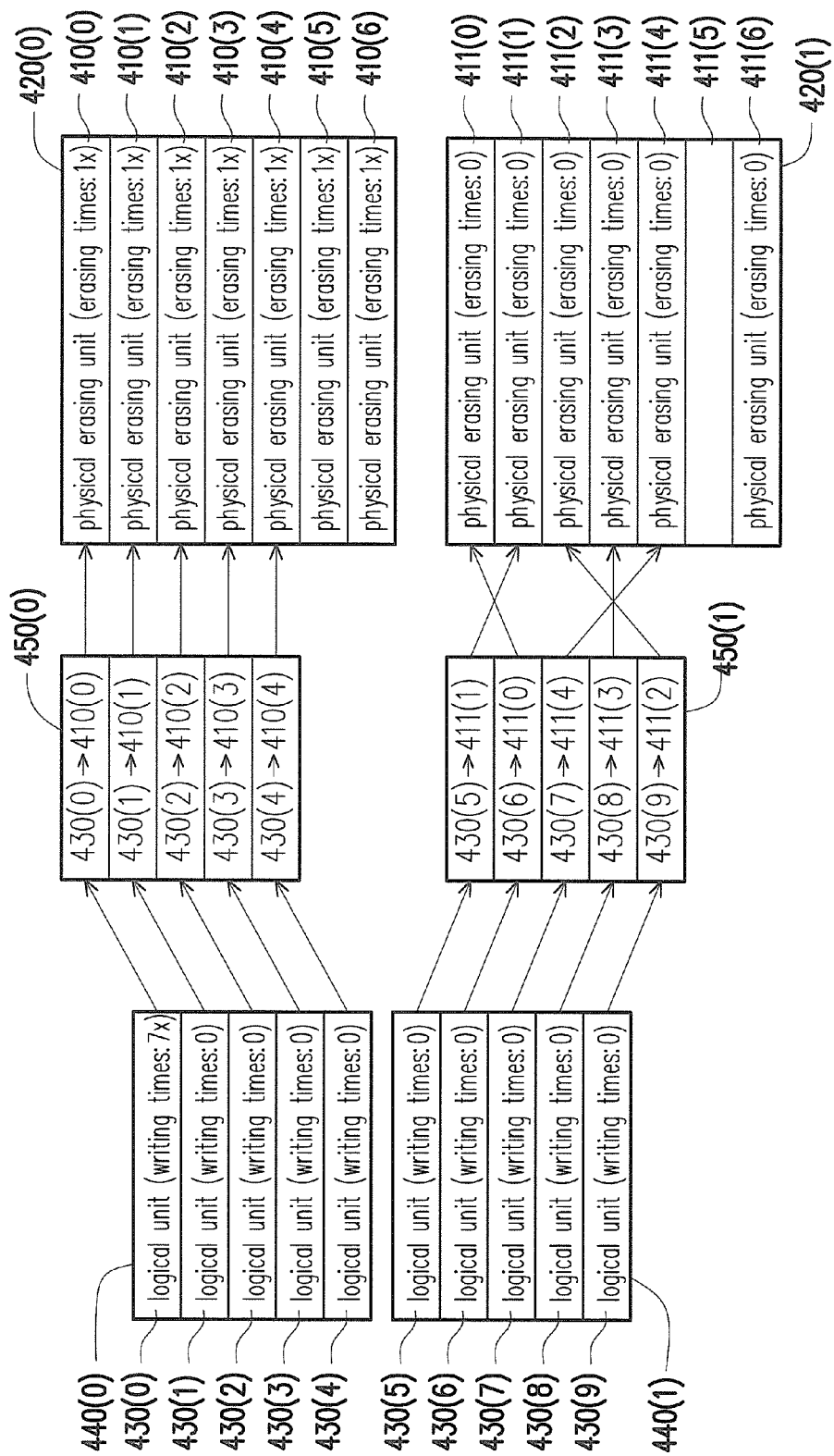
FIGS. 9 and 10 are schematic views illustrating managing mapping between logical unit groups and devices according to the first exemplary embodiment.
Figure 10:
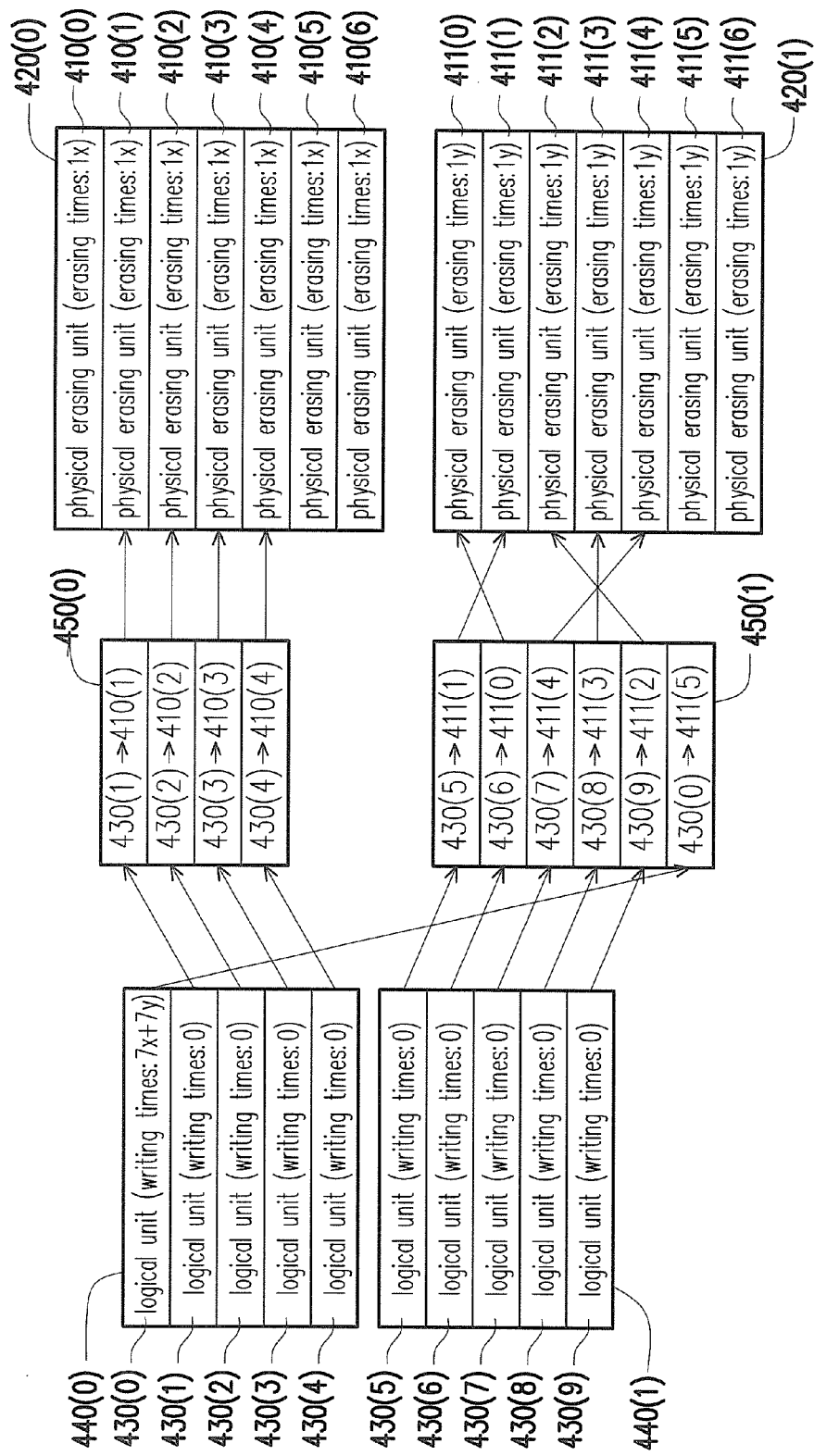

FIGS. 9 and 10 are schematic views illustrating managing mapping between logical unit groups and devices according to the first exemplary embodiment of the invention.

For the ease of description, a framework of the logical units that the host system is able to access and the rewritable non-volatile memory module 406 is simplified in the following. In this exemplary embodiment, as shown in FIG. 9, it is assumed that the host system 11 is able to access ten logical units 430(0) to 430(9), and the rewritable non-volatile memory module 406 has two devices 420(0) to 420(1). In addition, the first device 420(0) has seven physical erasing units 410(0) to 410(6), and the second device 420(1) has seven physical erasing units 411(0) to 411(6). The logical units 430(0) to 430(9) are grouped into two logical unit groups based on the number of devices. In addition, the first logical unit group 440(0) includes the logical units 430(0) to 430(4), and the second logical unit group 440(1) includes the logical units 430(5) to 430(9). The logical units 430(0) to 430(4) of the first logical unit group 440(0) are mapped to the physical erasing units 410(0) to 410(4) of the first device 420 (0). In addition, the physical erasing units 410(0) to 410(4) are associated with the data area 602(0) of the first device 420(0). The logical units 430(5) to 430(9) of the second logical unit group 440(1) are mapped to the physical erasing units 411(0) to 411(4) of the second device 420 (1). In addition, the physical erasing units 411(0) to 411(4) are associated with a data area 602(1) of the second device 420(1). Besides, the physical erasing units 410(5) to 410(6) of the first device 420(0) are associated with the spare area 604(0) of the first device 420(0) and the physical erasing units 411(5) to 411(6) of the second device 420(1) are associated with a spare area 604(1) of the second device 420(1).

In this exemplary embodiment, the memory control circuit unit 404 (or the memory management circuit 502) may refer to the mapping relation between the logical units and the physical erasing units of each device. For example, the memory control circuit unit 404 (or the memory management circuit 502) may establish a first logical-physical mapping table 450(0) to record and manage the mapping relation of the physical erasing units 410(0) to 410(6) corresponding to the first device 420(0). As shown in FIG. 9, the logical unit 430(0) is mapped to the physical erasing unit 420(0). Thus, the memory control circuit unit 404 (or the memory management circuit 502) records "430(0)→410(0)" in the first logical-physical mapping table 450(0), so as to indicate that the logical unit 430(0) is mapped to the physical erasing unit 410(0). Accordingly, the memory control circuit unit 404 (or the memory management circuit 502) also establishes a second logical-physical mapping table 450(1) to manage the mapping relation of the physical erasing units 411(0) to 411(6) of the second device 420(1) and the logical units mapped to the physical erasing units 411(0) to 411(6). It should be noted that the framework of the logical units, the logical-physical mapping table, and the devices of the rewritable non-volatile memory module 406 are similar to those illustrated in FIGS. 10 and 13. Thus, similar contents are not reiterated in the following.

In this exemplary embodiment, the memory control circuit unit 404 (or the memory management circuit 502) calculates a wear value of each device by using the device as a unit. Specifically, the memory control circuit unit 404 (or the memory management circuit 502) may record the number of erasing times of each physical erasing unit of each device. A mean of erasing times of each device is calculated based on the number of erasing times of each physical erasing unit of each device, and the mean of erasing times of each device is used as the wear value of each device. For example, as shown in FIG. 9, the numbers of erasing times of the physical erasing units 410(0) to 410(6) of the first device 420(0) are all 1x times, and the numbers of erasing times of the physical erasing units 411(0) to 411(6) of the second device 420(1) are all zero times. Accordingly, the memory control circuit unit 404 (or the memory control circuit 502) may obtain 1x times as the mean of erasing times of the first device 420(0) and zero times as the mean of erasing times of the second device 420(1). In addition, the memory control circuit unit 404 (or the memory management circuit 502) may use the mean of erasing times of each device as the wear value corresponding to each device. Based on this example, the memory control circuit unit 404 (or the memory management circuit 502) may identify the wear value of the first device 420(0) as 1x, and the wear value of the second device 420(1) as 0.

In this exemplary embodiment, the memory control circuit unit 404 (or the memory management circuit 502) may also use the device as a unit to perform a wear-leveling operation to the physical erasing units in each device. For example, if the host system instructs to write the first data in a size of one logical unit into the first logical unit 430(0) of the first logical unit group 440(0) and the host system updates the first data 7x times, then, in correspondence with the first data that are updated 7x times, the first logical unit 430(0) is also updated (written) 7x times. Since the wear-leveling operation is performed by using the device as a unit and performed to the physical erasing units in the same device, after the wear-leveling operation of the first device 420(0), each of the physical erasing units 410(0) to 410(6) of the first device 420(0) is also erased 1x times, under a circumstance that the first logical unit 430(0) is written 7x times and other logical units 430(1) to 430(9) are not written. In other words, through the wear-leveling operation of the first device 420(0), the memory management circuit 502 may evenly distribute the 7x times of erasing times for one physical erasing unit to seven physical erasing units of the first device 420(0), such that each physical erasing unit is merely erased 1x times. In addition, the wear-leveling operation of the physical erasing units 410(0) to 410(6) of the first device 420(0) does not influence the physical erasing units 411(0) to 411(6) of the second device 420(1). The numbers of erasing times of the physical erasing units 411(0) to 411(6) of the second device 420(1) are also maintained at 0 times. Thus, the wear value of the first device 420(0) may be higher than the wear value of the second device 420(1), as the first logical unit 430(0) mapped to the physical erasing units of the first device 420(0) updates frequently.

It should be noted that, in this exemplary embodiment, the memory control circuit unit 404 (or the memory management circuit 502) may perform a remapping operation to prevent a high difference between the wear values of the devices in the rewritable non-volatile memory module 406. Specifically, as noted above, the memory control circuit unit 404 (or the memory management circuit 502) may record the wear value of each device and determine whether an operation status of these device meets a predetermined condition, so as to perform the remapping operation in correspondence with a result of determination.

For example, the memory control circuit unit 404 (or the memory management circuit 502) may determine whether a difference between the wear values of the devices is greater than a predetermined wear threshold. If the difference between the wear values of the devices is greater than the predetermined wear threshold, the memory control circuit unit 404 (or the memory management circuit 502) may determine that the operation status of the devices meets the predetermined condition (also called "first predetermined condition"), and the remapping operation (also called "first remapping operation") is performed in correspondence with the result of determination that the operation status of the devices meets the first predetermined condition. Generally speaking, a device constantly storing frequently updated data (also called "first data") has a higher wear value. If the difference obtained by subtracting the wear value of one device (also called "second device") from the wear value of another device (also called "first device") is greater than the predetermined wear threshold, the memory control circuit unit 404 (or the memory management circuit 502) may perform the first remapping operation, so as to store the first data to at least one physical erasing unit (also called "first physical erasing unit") of the second device, and remap at least one logical unit (also called "first logical unit") of the first logical unit group that the first data belong to the at least one physical erasing unit of the second device.

For example, referring to FIG. 9, if the predetermined wear threshold is "1x−1" and the difference (i.e., "1x") obtained by subtracting the wear value (i.e., "0") of the second device 420(1) from the wear value (i.e., "1x") of the first device 420(0) is greater than the predetermined wear threshold (i.e., "1x−1"), the memory control circuit unit 404 (or the memory management circuit 502) may perform the first remapping operation. Referring to FIG. 10, in the first remapping operation, the memory management circuit may choose the physical erasing unit 411(5) (also called "first physical erasing unit") from the spare area 604(1) of the second device 420(1), store the first data to the chosen first physical erasing unit 411(5) of the second device 420(1), and remap the first logical unit 430(0) instructed to store the first data by the host system to the first physical erasing unit 411(5) of the second device 420(1). In addition, the first physical erasing unit 411(5) is associated with the data area 602(1) of the second device 420(1). In addition, as shown in FIG. 10, the first logical-physical unit mapping table 450(0) and the second logical-physical unit mapping table are also updated after the first remapping operation is performed. For example, as shown in FIG. 10, the second logical-physical mapping table 450(1) may record "430(0)→411(5)." It should be noted that formats for recording the mapping relation in the first logical-physical mapping table 450(0) and the second logical-physical mapping table 450(1) are merely described herein for an illustrative purpose, and the invention is not limited thereto.

It should be noted that, in this exemplary embodiment, if the difference between the wear values of the devices is greater than the predetermined wear threshold, the memory control circuit unit 404 (or the memory management circuit 502) may determine that the operation status of the devices meets the first predetermined condition, and the first remapping operation is pertained in correspondence with the result of determination that the operation status of the devices meets the first predetermined condition. However, the present invention is not limited thereto. The manufacturer may set other suitable ways for determining whether the operation status of the devices meets the first predetermined condition accordingly. For example, in another exemplary embodiment, the memory control circuit unit 404 (or the memory management circuit 502) may determine whether the wear value of each of the devices is greater than a predetermined wear threshold. If the wear value of a device (also called "first device") of the devices is greater than the predetermined wear threshold, the memory control circuit unit 404 (or the memory management circuit 502) may determine that the operation status of the devices meets the first predetermined condition and the first remapping operation is performed based on the result of determination that the operation status of the devices meets the first predetermined condition. Particularly, in another exemplary embodiment, the predetermined wear threshold correspondingly increases as an overall wear value of the devices increases.

For example, in a case where the wear values of all the devices at the outset are "0" and the predetermined wear threshold is set at "1000," when the wear value of the first device reaches "1001" (i.e., greater than the predetermined wear threshold), the memory control circuit unit 404 (or the memory management circuit 502) may perform the first remapping operation. The first remapping operation is similar to the example described above, and is thus not repeated herein. It should be noted that, in an embodiment, the memory control circuit unit 404 (or the memory management circuit 502) may also choose a device having a wear value lower than the wear value of the first device as the second device, so as to perform the first remapping operation. Besides, when the memory control circuit unit 404 (or the memory management circuit 502) determines that the wear values of all of the devices exceed the predetermined wear threshold, the memory control circuit unit 404 (or the memory management circuit 502) may increase the predetermined wear threshold. For example, when the wear value of each device exceeds the predetermined wear threshold, the memory control circuit unit 404 (or the memory management circuit 502) may adjust the predetermined wear threshold from the original "1000" to "2000." In other words, the memory control circuit unit 404 (or the memory management circuit 502) may dynamically adjust the predetermined wear threshold based on the overall wear level of the memory storage apparatus, so as to continuously perform the remapping operation to each device to keep the wear values of the devices leveled.

It should be noted that, in another exemplary embodiment, the memory control circuit unit 404 (or the memory management circuit 502) may, based on the numbers of erasing times, further choose the physical erasing unit having the lowest number of erasing times from the physical erasing units 411(5) to 411(6) in the spare area 604(1) of the second device 420(1) as the first physical erasing unit to store the first data. In other words, the memory control circuit unit 404 (or the memory management circuit 502) may select the youngest physical erasing block (e.g., the physical erasing unit with the lowest number of erasing times) from the spare area.

Besides, in yet another exemplary embodiment, the memory control circuit unit 404 (or the memory management circuit 502) performs the first remapping operation when the first physical erasing unit of the first device is full and a writing command of dating the first data is received from the host system. In other words, when the memory management circuit 502 determines that the difference obtained by subtracting the wear value of the second device 420(1) from the wear value of the first device 420(0) is greater than the predetermined wear threshold, the memory control circuit unit 404 (or the memory management circuit 502) does not immediately perform the first remapping operation. Instead, the first remapping operation is performed when the first physical erasing unit originally storing the first data is full and the updated first data are to be written to another empty physical erasing unit, such that the updated first data are written to the first physical erasing unit of the second device and the first logical unit is remapped to the first physical erasing unit of the second device.

In this exemplary embodiment, the frequently updated data (also called "first data") has a higher updating frequency than an updating frequency of data (also called "second data) stored in other physical erasing units not storing the first data. The first data are file system data, for example, and the second data are user data having a lower updating frequency than the updating frequency of the first data. The file system data may be, for example, a file allocation table (FAT), a new technology file system (NTFS), an extended file allocation table (exFAT), a file system table, a directory, a master boot record (MBR), a GUID partition table (GPT), and other file system data that are updated frequently. However, the invention is not limited thereto.

For example, in another embodiment, the memory control circuit unit 404 (or the memory management circuit 502) may further determine a property of logical unit and data corresponding to the logical unit based on how busy the logical unit is. For example, in another exemplary embodiment, the memory control circuit unit 404 (or the memory management circuit 502) may further record the number of updated times of each logical unit, and view data stored in the most frequently updated logical unit as the first data and the logical unit storing the first data as the first logical unit.

Then, when performing the remapping operation, the memory control circuit unit 404 (or the memory management circuit 502) remaps the first data and the first logical unit. It should be noted that, under some circumstances, the memory control circuit unit 404 (or the memory management circuit 502) may store user data or other types of data with a high updating frequency, and the data with the high updating frequency may also be viewed as first data.

It should be noted that, in the above example, after the memory control circuit unit 404 (or the memory management circuit 502) performs the first remapping operation, assuming that the first logical unit 430(0) storing the first data is updated (written) another 7y times (i.e., the number of writing times of the first logical unit 430(0) is 7X+7y), the number of erasing times of each physical erasing unit of the second device 420(1) is changed from 0 to 1y after performing the wear-leveling operation to the second device 420(1), since the first logical unit is remapped to the first physical erasing unit 411(5) of the second device 420(1), as described above. In other words, by performing the first remapping operation, the memory management circuit 502 may use the device having a lower wear value to store the first data (that are updated frequently), such that the difference between the wear values of the devices of the rewritable non-volatile memory module becomes lower. The wear is thus leveled.

Figure 11:
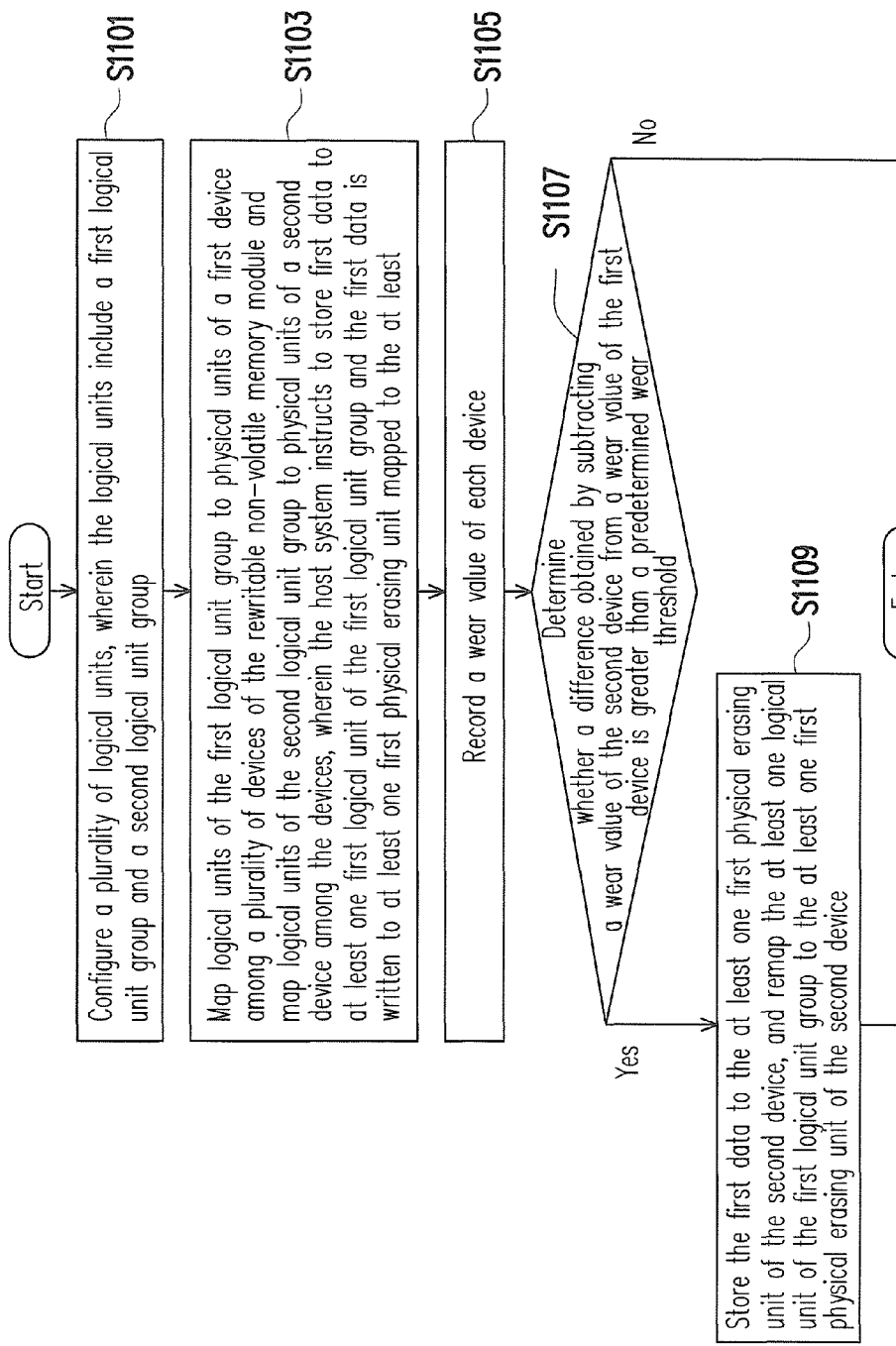
FIG. 11 is a flowchart illustrating a memory management method according to the first exemplary embodiment.

FIG. 11 is a flowchart illustrating a memory management method according to the first exemplary embodiment.

In Step S1101, the memory control circuit unit 404 (or the memory management circuit 502) configures the logical units. In addition, the logical units include the first logical unit group and the second logical unit group.

In Step S1103, the memory control circuit unit 404 (or the memory management circuit 502) maps the logical units of the first logical unit group to the physical erasing units of the first device of the devices of the rewritable non-volatile memory module, and maps the logical units of the second logical unit group to the physical erasing units of the second device of the devices. In addition, the host system instructs to store the first data in the at least one first logical unit of the first logical unit group, and the first data are written to the at least one first physical erasing unit of the first device mapped to the at least one first logical unit.

In Step S1105, the memory control circuit unit 404 (or the memory management circuit 502) records the wear value of each device.

In Step S1107, the memory control circuit unit 404 (or the memory management unit 502) may determine whether the difference obtained by subtracting the wear value of the second device from the wear value of the first device is greater than the predetermined wear threshold.

If the difference obtained by subtracting the wear value of the second device from the wear value of the first device is not greater than the predetermined wear threshold, the process shown in FIG. 11 ends.

If the memory management circuit 502 determines that the difference obtained by subtracting the wear value of the second device from the wear value of the first device is greater than the predetermined wear threshold, in Step S1309, the memory control circuit unit 404 (or the memory management circuit 502) may store the first data to the at least one first physical erasing unit of the second device, and remap the at least one first logical unit of the first logical unit group to the at least one physical erasing unit of the second device. Then, the process shown in FIG. 11 ends.

Second Exemplary Embodiment

A hardware framework of the second exemplary embodiment is similar to that of the first exemplary embodiment. However, the second exemplary embodiment differs from the first exemplary embodiment in that, in the first exemplary embodiment, when the difference between the wear values of the first device and the second device is too high, the first data originally stored in the first device are stored to the second device and the first logical unit is remapped to the second device, while in the second exemplary embodiment, when an format operation or an operation of deleting all data is performed to the rewritable non-volatile memory, the logical unit groups mapped to the devices are switched, such that the device mapped to each of the logical unit groups differs from the original device. In other words, in the second exemplary embodiment, the memory control circuit unit 404 (or the memory management circuit 502) may determine the operation status of the devices meets another predetermined condition (also called "second predetermined condition"), and then perform another remapping operation (also called "second remapping operation"). In the following, the reference numerals of the components in the first exemplary embodiment, together with FIGS. 9 and 12, are used to describe the method of performing the another remapping operation of the second exemplary embodiment and a time point of performing the another remapping operation.

Figure 12:
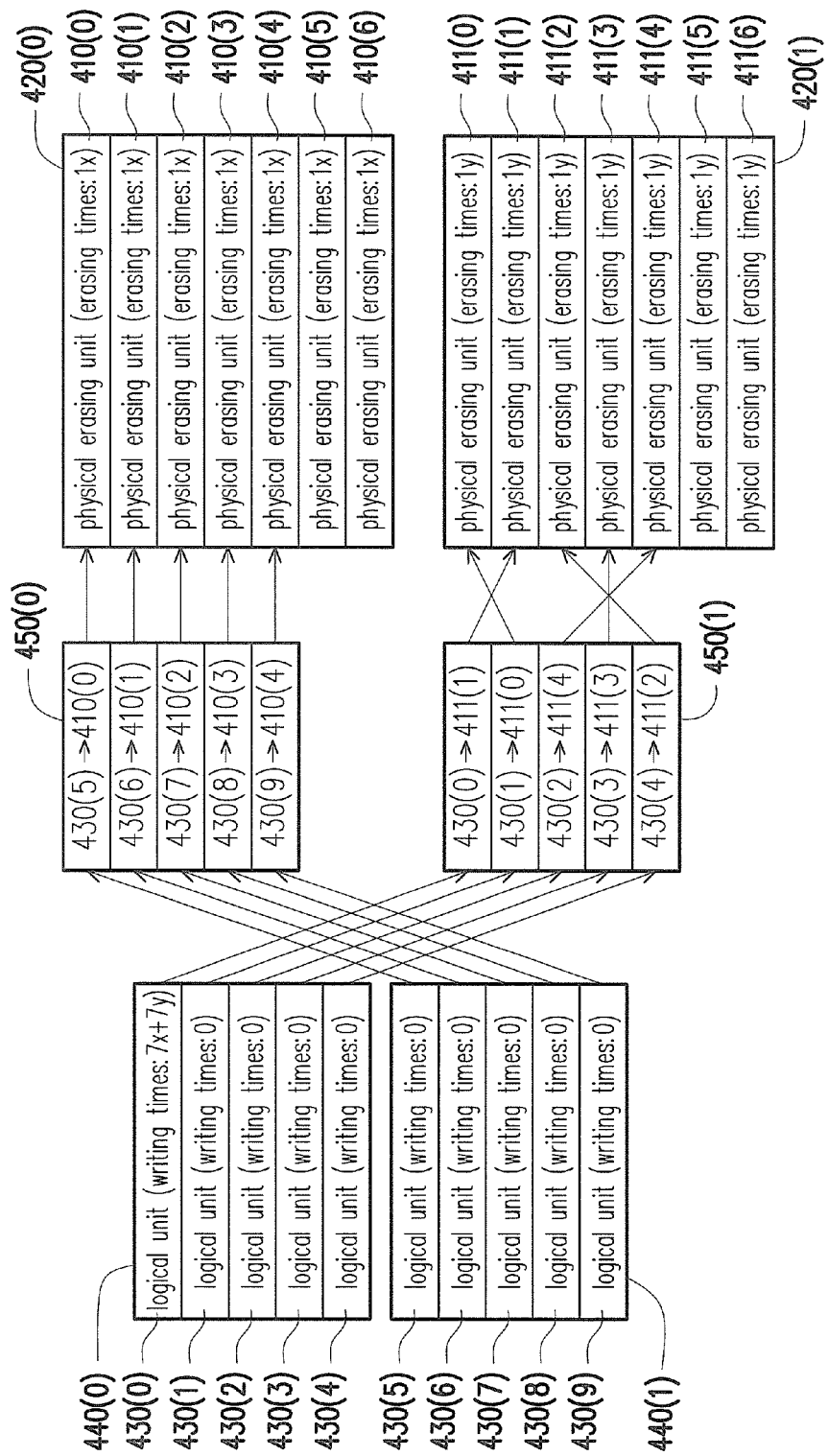
FIG. 12 is a schematic view illustrating managing mapping between logical unit groups and devices according to a second exemplary embodiment.

FIG. 12 is a schematic view illustrating managing mapping between logical unit groups and devices according to a second exemplary embodiment.

In the second exemplary embodiment, the memory control circuit unit 404 (or the memory management circuit 502) may determine whether the format command or the command of deleting all the data is received from the host system 11, and may perform the erasing operation to the physical erasing units of all the devices (e.g., the first device 420(0) and the second device 420(1) in FIG. 12) of the rewritable non-volatile memory module 406. If the physical erasing units of all the devices are erased due to the format command or the command of deleting all the data received from the host system 11, the memory control circuit unit 404 (or the memory management circuit 502) may determine that the operation status of the devices meets the second predetermined condition and perform the second remapping operation in correspondence with a result of determination that the operation status of the devices meets the second predetermined condition. In other words, the memory management circuit 502 may perform the second remapping operation after receiving the format command or the command of deleting all the data from the host system. It should be noted that, in another embodiment, the memory management circuit 502 may perform the second remapping operation after receiving the format command or the command of deleting all the data from the host system 11 and performing the erasing operation to the physical erasing units of all the devices (e.g., the first device 420(0) and the second device 420(1) in FIG. 12) of the rewritable non-volatile memory module 406.

Specifically, referring to FIG. 9, when the memory control circuit unit 404 (or the memory management circuit 502) receives the format command or erasing all the data from the host system 11, the memory control circuit unit 404 (or the memory management circuit 502) may determine that the operation status of the devices meets the second predetermined condition and perform the second remapping operation. Also, in the second remapping operation, in addition to remapping the first logical unit 430(0) of the first logical unit group 440(0) to the first physical erasing unit 420(1) of the second device, the memory control circuit unit 404 (or the memory management circuit 502) further remaps other logical units 430(1) to 430(4) of the first logical unit group to other physical erasing units 411(0) and 411(2) to 411(4) of the second device 420(1), as shown in FIG. 12. In other words, the memory control circuit unit 404 (or the memory management circuit 502) may remap all of the logical units 430(0) to 430(4) of the first logical unit group 440(0) to the physical erasing units 411(0) to 411(4) of the second device 420(1). Correspondingly, the memory control circuit unit 404 (or the memory management circuit 502) may remap all of the logical units 430(5) to 430(9) of the second logical unit group 440(1) to the physical erasing units 410(0) to 410(4) of the first device 420(0). In other words, in the second exemplary embodiment, when the format command or the command of deleting all the data is received, the memory control circuit unit 404 (or the memory management circuit 502) may perform the second remapping operation, such that the physical erasing units originally mapped to the logical units of each of the logical unit groups are changed to the physical erasing units of another device. It should be noted that the second remapping operation may be performed before or after the erasing operation corresponding to the format command or the command of deleting all the data.

Similarly, after the second remapping operation is completely performed, the memory control circuit unit 404 (or the memory management circuit 502) may also correspondingly update the first logical-physical unit mapping table and the second logical-physical unit mapping table. It should be noted that, similar to the description about FIG. 10, in FIG. 12, since the first logical unit 430(0) is remapped to the first physical erasing unit 411(1) of the second device 420(1), the number of erasing times of each physical erasing unit of the second device 420(1) may be changed from 0 to 1y after the wear-leveling operation to the second device 420(1). In other words, after the remapping operation provided in the second exemplary embodiment, the difference between the wear values of the devices is also reduced.

It should be noted that, in the second exemplary embodiment, the memory control circuit unit 404 (or the memory management circuit 502) may choose the device having the lowest wear value based on the wear values of the devices, so as to perform the second remapping operation. For example, referring to FIG. 9, the wear value of the first device 420(0) is 1x, and the second device 420(1) is 0. The wear value of the second device 420(1) is the device having the lowest wear value in all the devices (i.e., the first device 420(0) and the second device 420(1)) of the rewritable non-volatile memory module 406. When the memory management circuit 502 performs the second remapping operation, the memory management circuit 502 may choose the second device 420(1) to perform the second remapping operation. In other words, under such circumstance, the memory control circuit unit 404 (or the memory management circuit 502) may map the logical units 430(0) to 430(4) of the first logical unit group 440(0) to the physical erasing units 411(0) to 411(4) of the second device 420(1), and map the logical units 430(5) to 430(9) of the second logical unit group 440(1) to the physical erasing units 410(0) to 410(4) of the first device 420(0), as shown in FIG. 12. It should be noted that in FIG. 9, the rewritable non-volatile memory module 406 is described to have two devices. Thus, when the second remapping operation is performed, mapping relations of the first and second devices are exchanged. However, the invention is not limited thereto. For instance, in an example where the rewritable non-volatile memory module 406 has three devices, based on the wear value of each device, the memory control circuit unit 404 (or the memory management circuit 502) may choose the first and second devices, the first and third devices, or the second and third devices to perform the second remapping operation.

Figure 13:
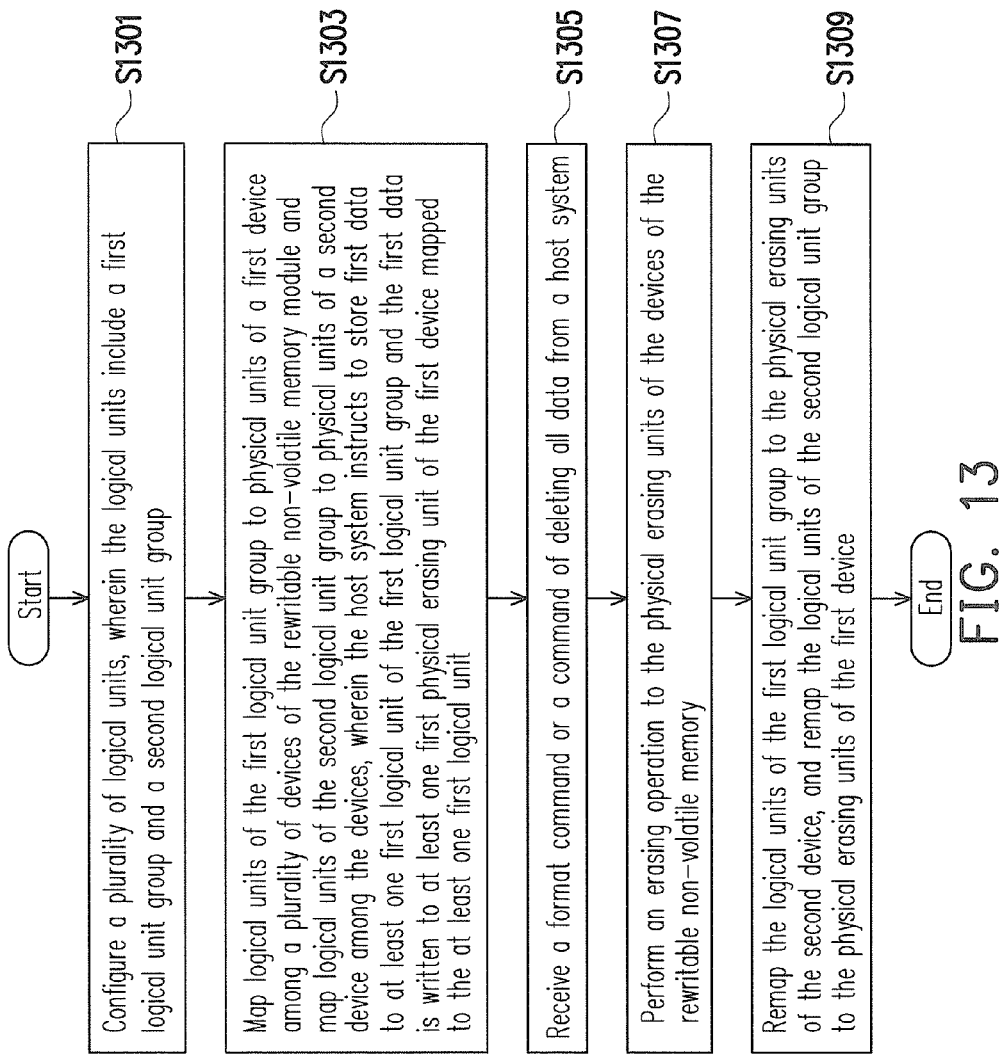
FIG. 13 is a flowchart illustrating a memory management method according to the second exemplary embodiment.

FIG. 13 is a flowchart illustrating a memory management method according to the second exemplary embodiment.

In Step S1301, the memory control circuit unit 404 (or the memory management circuit 502) configures the logical units. In addition, the logical units include the first logical unit group and the second logical unit group.

In Step S1303, the memory control circuit unit 404 (or the memory management circuit 502) maps the logical units of the first logical unit group to the physical erasing units of the first device of the devices, and maps the logical units of the second logical unit group to the physical erasing units of the second device of the devices. In addition, the host system instructs to store the first data in the at least one first logical unit of the first logical unit group, and the first data is written to the at least one first physical erasing unit of the first device mapped to the at least one first logical unit.

In Step S1305, the memory control circuit unit 404 (or the memory management circuit 502) receives the format command or the command of deleting all the data from the host system.

In Step S1307, the memory control circuit unit 404 (or the memory management circuit 502) may perform the erasing operation to the physical erasing units of the devices of the rewritable non-volatile memory module.

In Step S1309, the memory control circuit unit 404 (or the memory management circuit 502) may remap the logical units of the first logical unit group to the physical erasing units of the second device, and remap the logical units of the second logical unit group to the physical erasing units of the first device. Then, the process shown in FIG. 13 ends.

It should be noted that, in this exemplary embodiment, the memory control circuit unit 404 (or the memory management circuit 502) may further record the wear value of each device. Accordingly, in Step S1309, the memory management circuit 502 may choose, among the devices, the physical erasing units of the second device having the lowest wear value to be remapped to the logical units of the first logical unit group, and remap the logical units of the second logical unit group originally mapped physical erasing units of the second device to the physical erasing units of the first device.

It should also be noted that, in the exemplary embodiment of the invention, the number of the first physical erasing unit storing the first data is 1. However, the invention is not limited thereto. For example, in other exemplary embodiments, the number of the first physical erasing units storing the first data may be two or more. Similarly, the number of the first logical unit storing the first data as instructed by the host system 11 may be one or more.

Besides, in the exemplary embodiments above, the memory management circuit 502 may use the mean of erasing times of the devices as the wear value of each device. However, the present invention is not limited thereto. For example, in another exemplary embodiment, the memory management circuit 502 may use the mean of writing times of the devices or a sum of a multiple of the mean of erasing times of the devices and another multiple of the mean of writing times of the devices as the wear value of each device. Also, in yet another exemplary embodiment, the memory management circuit 502 may also calculate the wear value of each device based on the mean of error bits or other information related to the wear value of the devices.

In view of the foregoing, according to the memory management method, the memory control circuit unit, and the memory storage apparatus according to the exemplary embodiments of the present invention, the wear value of each device of the rewritable non-volatile memory is recorded. In addition, when the difference between the wear value of a device is highly different from the wear value of another device, the remapping operation is performed so as to remap the logical units corresponding to frequently updated or accessed data from the physical erasing units of the device having a higher wear value to the physical erasing units of the device having a lower wear value. In addition, according to the memory management method, the memory control circuit unit, and the memory storage apparatus according to the exemplary embodiments of the present invention, the memory control circuit unit and the memory storage apparatus further switch the logical units originally mapped to the physical erasing units of the devices after performing the erasing operation to all the data of the devices or performing the format operation to the devices. In this way, the memory management method, the memory control circuit unit, and the memory storage apparatus according to the exemplary embodiments of the present invention are able to keep the wear values of the devices in the rewritable non-volatile memory leveled, thereby elongating the lifetime of the memory storage apparatus.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A memory management method for a rewritable non-volatile memory module, wherein the rewritable non-volatile memory module has a plurality of devices, and each of the devices has a plurality of physical erasing units, the memory management method comprising:
configuring a plurality of logical units, wherein the logical units are at least divided into a first logical unit group and a second logical unit group;
mapping logical units in the first logical unit group to physical erasing units of a first device among the devices and mapping logical units in the second logical unit group to physical erasing units of a second device among the devices;
receiving first data stored into at least one first logical unit of the first logical unit group from a host system, writing the first data into at least one first physical erasing unit of the first device, wherein the at least one first physical erasing unit is mapped to the at least one first logical unit; and
if an operation status of the devices meets a predetermined condition, performing a remapping operation corresponding to the predetermined condition only when the at least one first physical erasing unit of the first device is full and a writing command of updating the first data is received from the host system,
wherein the step of performing the remapping operation corresponding to the predetermined condition if the operation status of the devices meets the predetermined condition comprises:
recording a wear value of each of the devices; and
if the wear value of the first device is greater than a predetermined wear threshold, determining that the operation status of the devices meets a first predetermined condition and performing a first remapping operation corresponding to the first predetermined condition,
wherein the first remapping operation comprises storing the first data to at least one first physical erasing unit of the second device and remapping the at least one first logical unit of the first logical unit group to the at least one first physical erasing unit of the second device.

2. The memory management method as claimed in claim 1, wherein the step of performing the remapping operation corresponding to the predetermined condition if the operation status of the devices meets the predetermined condition comprises:
if a format command or a command of deleting all data is received from the host system, determining that the operation status of the devices meets a second predetermined condition and performing a second remapping operation corresponding to the second predetermined condition,
wherein the second remapping operation comprises remapping the at least one first logical unit of the first logical unit group to at least one first physical erasing unit of the second device, remapping other logical units of the first logical unit group to other physical erasing units of the second device, and remapping the logical units of the second logical unit group to the physical erasing units of the first device.

3. The memory management method as claimed in claim 2, further comprising:
recording a wear value of each of the devices, wherein the wear value of the second device is lower than the wear values of other devices in the devices.

4. The memory management method as claimed in claim 2, wherein the remapping operation further comprises choosing the at least one first physical erasing unit of the second device based on the number of erasing times of each of the physical erasing units of the second device, wherein the number of erasing times of the at least one first physical erasing unit of the second device is lower than the numbers of erasing times of other physical erasing units of the second device.

5. The memory management method as claimed in claim 1, wherein an updating frequency of the first data is greater than the updating frequency of second data, and the second data are data stored in other physical erasing units not storing the first data among the physical erasing units.

6. A memory storage apparatus, comprising:
a connecting interface unit configured to couple to a host system;
a rewritable non-volatile memory module having a plurality of devices, wherein each of the devices has a plurality of physical erasing units;
a memory control circuit unit coupled to the connecting interface unit and the rewritable non-volatile memory module,
wherein the memory control circuit unit is configured to configure a plurality of logical units comprising a first logical unit group and a second logical unit group,
the memory control circuit unit is further configured to map logical units of the first logical unit group to physical erasing units of a first device among the devices and map logical units of the second logical unit group to physical erasing units of a second device among the devices,
the memory control circuit unit is further configured to receive first data stored in at least one first logical unit of the first logical unit group from a host system, writes the first data to at least one first physical erasing unit of the first device, wherein the at least one first physical erasing unit is mapped to the at least one first logical unit, and if an operation status of the devices meets a predetermined condition, the memory control circuit unit is further configured to perform a remapping operation corresponding to the predetermined condition, wherein in the operation of performing the remapping operation corresponding to the predetermined condition if the operation status of the devices meets the predetermined condition, if the memory control circuit unit receives a format command or a command of deleting all data from the host system, the memory control circuit unit determines that the operation status of the devices meets a second predetermined condition and performs a second remapping operation corresponding to the second predetermined condition, and the second remapping operation comprises remapping the at least one first logical unit of the first logical unit group to the at least one first physical erasing unit of the second device, remapping other logical units of the first logical unit group to other physical erasing units of the second device, and remapping logical units of the second logical unit group to the physical erasing units of the first device.

7. The memory storage apparatus as claimed in claim 6, wherein in the operation of performing the remapping operation corresponding to the predetermined condition if the operation status of the devices meets the predetermined condition, the memory control circuit unit records a wear value of each of the devices, if a difference obtained by subtracting the wear value of the second device from the wear value of the first device is greater than a predetermined wear value, the memory control circuit unit determines that the operation status of the devices meets a first predetermined condition and performs a first remapping operation corresponding to the first predetermined condition, and the first remapping operation comprises storing the first data to the at least one first physical erasing unit of the second device and remapping the at least one first logical unit of the first logical unit group to the at least one first physical erasing unit of the second device.

8. The memory storage apparatus as claimed in claim 7, wherein the memory management circuit performs the first remapping operation when the at least one first physical erasing unit of the first device is full and a writing command of updating the first data is received from the host system.

9. The memory storage apparatus as claimed in claim 6, wherein the memory control circuit unit records a wear value of each of the devices, and the wear value of the second device is lower than the wear values of other devices of the devices.

10. The memory storage apparatus as claimed in claim 6, wherein in the operation of performing the second remapping operation, the memory control circuit unit chooses the at least one first physical erasing unit of the second device based on the number of erasing times of each of the physical erasing units, and the number of erasing times of the at least one first physical erasing unit of the second device is lower than the numbers of erasing times of other physical erasing units.

11. The memory storage apparatus as claimed in claim 6, wherein an updating frequency of the first data is greater than the updating frequency of second data, and the second data are data stored in other physical erasing units not storing the first data of the physical erasing units.

12. A memory management method for a rewritable non-volatile memory module, wherein the rewritable non-volatile memory module has a plurality of devices, and each of the devices has a plurality of physical erasing units, the memory management method comprising:

configuring a plurality of logical units, wherein the logical units are at least divided into a first logical unit group and a second logical unit group;

mapping logical units in the first logical unit group to physical erasing units of a first device among the devices and mapping logical units in the second logical unit group to physical erasing units of a second device among the devices;

receiving first data stored into at least one first logical unit of the first logical unit group from a host system, writing the first data into at least one first physical erasing unit of the first device, wherein the at least one first physical erasing unit is mapped to the at least one first logical unit; and if an operation status of the devices meets a predetermined condition, performing a remapping operation corresponding to the predetermined condition, wherein the step of performing the remapping operation corresponding to the predetermined condition if the operation status of the devices meets the predetermined condition comprises:

if a format command or a command of deleting all data is received from the host system, determining that the operation status of the devices meets a second predetermined condition and performing a second remapping operation corresponding to the second predetermined condition, wherein the second remapping operation comprises remapping the at least one first logical unit of the first logical unit group to at least one first physical erasing unit of the second device, remapping other logical units of the first logical unit group to other physical erasing units of the second device, and remapping the logical units of the second logical unit group to the physical erasing units of the first device.

13. The memory management method as claimed in claim 12, wherein the step of performing the remapping operation corresponding to the predetermined condition if the operation status of the devices meets the predetermined condition comprises:

recording a wear value of each of the devices; and if the wear value of the first device is greater than a predetermined wear threshold, determining that the operation status of the devices meets a first predetermined condition and performing a first remapping operation corresponding to the first predetermined condition, wherein the first remapping operation comprises storing the first data to at least one first physical erasing unit of the second device and remapping the at least one first logical unit of the first logical unit group to the at least one first physical erasing unit of the second device.

14. The memory management method as claimed in claim 13, wherein the step of performing the first remapping operation is performed when the at least one first physical erasing unit of the first device is full and a writing command of updating the first data is received from the host system.

15. The memory management method as claimed in claim 12, further comprising:
   recording a wear value of each of the devices, wherein the wear value of the second device is lower than the wear values of other devices in the devices.

16. The memory management method as claimed in claim 12, wherein the remapping operation further comprises choosing the at least one first physical erasing unit of the second device based on the number of erasing times of each of the physical erasing units of the second device, wherein the number of erasing times of the at least one first physical erasing unit of the second device is lower than the numbers of erasing times of other physical erasing units of the second device.

17. The memory management method as claimed in claim 12, wherein an updating frequency of the first data is greater than the updating frequency of second data, and the second data are data stored in other physical erasing units not storing the first data among the physical erasing units.

* * * * *